(12) United States Patent
Liu et al.

(10) Patent No.: US 11,534,873 B2
(45) Date of Patent: Dec. 27, 2022

(54) SELF-SHIELDED FLUX-CORED WELDING WIRE WITH SPECIAL PROTECTIVE SLAG COATING FORMED IN SITU AND MANUFACTURE METHOD THEREOF

(71) Applicants: HEFEI UNIVERSITY OF TECHNOLOGY, Hefei (CN); CHINA INNOVATION ACADEMY OF INTELLIGENT EQUIPMENT (NINGBO) CO., LTD., Ningbo (CN)

(72) Inventors: Dashuang Liu, Hefei (CN); Weimin Long, Ningbo (CN); Yucheng Wu, Hefei (CN); Ping Wei, Hefei (CN); Huawei Sun, Ningbo (CN); Yafang Cheng, Ningbo (CN)

(73) Assignees: HEFEI UNIVERSITY OF TECHNOLOGY, Hefei (CN); CHINA INNOVATION ACADEMY OF INTELLIGENT EQUIPMENT (NINGBO) CO., LTD., Ningbo (CN)

( * ) Notice: Subject to any disclaimer, the term of this patent is extended or adjusted under 35 U.S.C. 154(b) by 402 days.

(21) Appl. No.: 16/988,623

(22) Filed: Aug. 8, 2020

(65) Prior Publication Data
US 2020/0368853 A1 Nov. 26, 2020

(51) Int. Cl.
| | |
|---|---|
| *B23K 35/368* | (2006.01) |
| *B23K 35/02* | (2006.01) |
| *B23K 35/36* | (2006.01) |
| *B23K 35/362* | (2006.01) |
| *B23K 103/00* | (2006.01) |

(52) U.S. Cl.
CPC ........ *B23K 35/368* (2013.01); *B23K 35/0266* (2013.01); *B23K 35/361* (2013.01); *B23K 35/3602* (2013.01); *B23K 35/362* (2013.01); *B23K 35/3607* (2013.01); *B23K 35/3608* (2013.01); *B23K 2103/52* (2018.08); *B23K 2103/54* (2018.08)

(58) Field of Classification Search
CPC .............. B23K 35/368; B23K 35/0266; B23K 35/3602; B23K 35/3607; B23K 35/3608; B23K 35/361; B23K 35/362; B23K 2103/52; B23K 2103/54; B23K 35/3601; B23K 35/406; C21C 7/0056
USPC ..................................................... 219/146.52
See application file for complete search history.

(56) References Cited

FOREIGN PATENT DOCUMENTS

| | | |
|---|---|---|
| CN | 1810438 A | 8/2006 |
| CN | 1827287 A | 9/2006 |
| CN | 104867536 A | 8/2015 |
| CN | 106112302 A | 11/2016 |
| CN | 106141488 A | 11/2016 |
| CN | 106271198 A | 1/2017 |
| CN | 108356447 A | 8/2018 |
| JP | S58184095 A | 10/1983 |
| JP | H06285677 A | 10/1994 |

OTHER PUBLICATIONS

Liu Dashuang, "Slag splashing behavior of non-slag-protected flux-ored wires" Welding Transactions, vol. 36, No. 5, p. 10-12, 84, May 25, 2015.

*Primary Examiner* — Keith Walker
*Assistant Examiner* — Adil A. Siddiqui
(74) *Attorney, Agent, or Firm* — CBM Patent Consulting, LLC

(57) ABSTRACT

A self-shielded flux-cored welding wire with a special protective slag coating formed in situ and a manufacture method thereof. The self-shielded flux-cored welding wire includes a low-carbon steel belt and a flux core powder, the flux core powder is filled in the low-carbon steel belt, the flux core powder includes the following ingredients in percentage by mass: 60-80% glass powder, 2-8% zirconium oxide powder, 0.05-0.85% graphene powder, 2-8% potassium carbonate sodium powder, 1-3% potassium titanate powder, 2-5% rutile powder, 1-5% corundum powder, 1-3% sodium fluorosilicate powder, and the balance of iron powder, and a weight of the flux core powder accounts for 13-25% of a total weight of the welding wire.

10 Claims, No Drawings

SELF-SHIELDED FLUX-CORED WELDING WIRE WITH SPECIAL PROTECTIVE SLAG COATING FORMED IN SITU AND MANUFACTURE METHOD THEREOF

This application claims priority to Chinese Patent Application Ser. No. CN201911272500.X filed on 11 Dec. 2019.

TECHNICAL FIELD

The present invention belongs to the field of welding in material processing engineering, and more particularly, relates to a self-shielded flux-cored welding wire with special protective slag coating formed in situ and manufacture method thereof.

BACKGROUND

Since the birth of welding technology, welding slag plays an important role in welding metallurgy, but the welding slag has always been treated as an inevitable by-product, and deslagging is required after welding, so that a lot of labor hours are consumed, and waste slag discharge also causes serious pollution to the environment. A deslagging property is one of the key process property indexes in development of a self-shielded flux-cored welding wire, and difficult deslagging of bonded slag restricts a welding process property.

On one hand, the deslagging after welding is a necessary procedure for welding. On the other hand, secondary coating is further required to make a welded joint meet special property requirements such as weather resistance, corrosion resistance and the like after welding, which greatly wastes the labor hours, increases energy consumption and wastes resources. For example, when welding repair is performed on a ship or other water structures using traditional welding materials, not only a deslagging procedure is required after welding, but also a seawater corrosion-resistant coating needs to be coated on the welded joint after welding, which is very unfavorable for fast on-site operation.

Up to now, human beings still use the slag as a waste slag that must be removed. There have been no reports regarding that the slag is used as a beneficial coating capable of realizing surface modification, and there have been no reports regarding that one-step preparation and molding of a double-layer functional metal structure is performed by the welding technology.

SUMMARY

Objective of the invention: in order to solve the technical problem in the prior art, the present invention provides a self-shielded flux-cored welding wire with a special protective slag coating formed in situ and capable of preventing seawater corrosion, and a manufacture method thereof.

Technical solution: in order to achieve the above technical objective, the present invention provides a flux core powder, wherein the flux core powder includes the following ingredients in percentage by mass: 60-80% glass powder, 2-8% zirconium oxide powder, 0.05-0.85% graphene powder, 2-8% potassium carbonate sodium powder, 1-3% potassium titanate powder, 2-5% rutile powder, 1-5% corundum powder, 1-3% sodium fluorosilicate powder, and the balance of iron powder.

The glass powder includes 57.2% $SiO_2$, 22.8% $B_2O_3$, 5.7% $Na_2O$, 9.2% CaO, 3.2% $ZrO_2$ and 1.9% $Al_2O_3$.

The rutile powder includes no less than 98% $TiO_2$ and the balance of impurity elements Fe, Nb, Ta, Cr and Sn, and the corundum powder includes no less than 99% $Al_2O_3$ and the balance of impurity elements Cr, Ti, Fe and V.

The present invention further provides a special protective slag coating formed in situ, wherein the special protective slag coating formed in situ is prepared by a fusion welding method using the flux core powder.

The fusion welding method includes but is not limited to one of an arc fusion welding method or a laser fusion welding method.

The present invention further provides a self-shielded flux-cored welding wire with a special protective slag coating formed in situ, wherein the self-shielded flux-cored welding wire includes a low-carbon steel belt and the flux core powder, the flux core powder is filled in the low-carbon steel belt, and a weight of the flux core powder accounts for 13-25% of a total weight of the welding wire.

Preferably, the low-carbon steel belt is a low-carbon steel belt H08A, which specifically includes 0.1% C, 0.3-0.55% Mn, 0.3% Si, no more than 0.03% S, and no more than 0.03% P.

Preferably, particle sizes of the glass powder, the zirconium oxide powder, the graphene powder, the potassium carbonate sodium powder, the potassium titanate powder, the rutile powder, the corundum powder, the sodium fluorosilicate powder and the iron powder in the flux core powder are all greater than or equal to 150 meshes.

Preferably, a thickness×a width of the low-carbon steel belt is any one of 0.9 mm×14 mm or 0.8 mm×12 mm.

Preferably, a diameter of the welding wire is any one of 1.0 mm, 1.2 mm or 1.6 mm.

The contents of the present invention further include a manufacture method of the self-shielded flux-cored welding wire with the special protective slag coating formed in situ, which includes the following steps of:

(1) rolling the low-carbon steel belt in a U shape by a molding roller, and then adding the flux core powder into a U-shape groove through a powder delivery device according to 13-25% of the total weight of the welding wire; and (2) closing an opening of the U-shape groove to cover the flux core powder in the U-shape groove, drawing and reducing the diameter through a wire-drawing die one by one, and finally making the diameter thereof reach 1.0 mm, 1.2 mm or 1.6 mm to obtain a final product.

The main functions of all the ingredients in the above flux core are as follows.

Glass powder: the glass powder vitrifies the slag, plays a role of slag protection during welding, and forms a vitrified slag coating capable of effectively preventing rust, pollution and oxidation. When a content of the glass powder is less than 60%, a glass property of the coating is weakened, a coverage rate is reduced, an integrity of the glass coating is damaged, and a seawater corrosion resistance is deteriorated; and when the content of the glass powder is more than 80%, the vitrified slag coating is thickened, and has a weaker bonding strength with the welded joint, thus being easy to fall off.

Zirconium oxide powder: the zirconium oxide powder adjusts a property of the vitrified slag coating, and enhances a hardness of the slag and an acid and alkali corrosion resistance.

Graphene powder: graphene has a surface with an extremely large specific surface area, and has excellent heat and electrical conducting properties, and on one hand, deoxygenation occurs during chemical metallurgy and generates an ideal gas generation protection effect, and on the other hand, a physical behavior of an arc can also be greatly improved, and a stability of the arc is improved.

Potassium carbonate sodium powder: $CO_2$ gas is decomposed during welding, with the gas generation protection effect; and in addition, K and Na elements have an arc stabilizing effect. A decomposition product $(K, Na)_2O$ is used as a part of the vitrified slag coating to improve a toughness of the vitrified slag coating.

Potassium titanate powder: K has the arc stabilizing effect, $TiO_2$ and KO are decomposed as a part of the vitrified slag coating during welding to adjust physical and chemical properties of the vitrified slag coating and improve a corrosion resistance of the vitrified slag coating.

Rutile powder: the rutile powder improves a fluidity of the slag, and adjusts a melting point and a coverage of the slag coating.

Corundum powder: the corundum powder improves a chemical stability, a hardness and a corrosion resistance of the vitrified slag coating.

Sodium fluorosilicate powder: the sodium fluorosilicate powder enhances a fluidity of the slag coating and improves surface formation of the slag coating, thus enhancing a seawater corrosion resistance. Moreover, the sodium fluorosilicate powder can effectively reduce a content of H of the welded joint.

Iron powder: Fe is transferred to deposited metal, and a small amount of iron oxide increases an adhesion property of the coating to the weld bead.

It can be seen from the above technical solutions and the brief description of the functions of all the ingredients in the flux core that the glass powder is mainly added in the flux core according to the present invention to vitrify the slag, the glass powder plays the role of slag protection during welding, and forms the vitrified slag coating capable of effectively preventing rust, pollution and oxidation. The zirconium oxide powder, the rutile powder and the corundum power are simultaneously added to improve the fluidity of the slag, adjust the melting point and the coverage of the slag coating, adjust the melting point and the physical and chemical properties of the vitrified slag coating, and enhance the hardness of the slag and the acid and alkali corrosion resistance. When the graphene powder is added, on one hand, the deoxygenation occurs during chemical metallurgy and generates the ideal gas generation protection effect, and on the other hand, the physical behavior of the arc can also be greatly improved, and the stability of the arc is improved. In addition, addition of the potassium carbonate sodium powder, the potassium titanate powder, the sodium fluorosilicate powder and other mineral ingredients containing K or Na plays roles of gas generation, arc stabilization, adjustment of composition of the vitrified slag coating and improvement of the property thereof, and can effectively reduce the content of H of the welded joint. The iron powder is oxidized to form $Fe_2O_3$, which is embedded into metal of the welded joint with corundum $Al_2O_3$ as spinel to enhance a bonding force between the vitrified slag coating and the metal of the welded joint. The glass powder, the zirconium oxide powder, the graphene powder, the potassium carbonate sodium powder, the potassium titanate powder, the rutile powder, the corundum powder, the sodium fluorosilicate powder, the iron powder and other ingredients above act jointly, on one hand, the slag is formed to isolate air, the gas generation effect is generated by carbonate, and the deoxygenation and the gas generation effect are enhanced by the graphene with a great chemical activity, so as to improve a self-shielded effect; and on the other hand, the formed vitrified slag coating is evenly covered on the surface of the weld bead, and has a metallurgical bonding effect with the weld bead, thus having a seawater corrosion resistance effect.

Beneficial Effects:

1. The slag coating of the present invention has special protective functions such as seawater corrosion resistance and the like, may be used for on-site coating-free welding repair of a ship or other water structures, and may also be used for one-step welding molding and preparation of a double-layer functional metal/glass structure. The present invention has advantages of eliminating a deslagging procedure, reducing waste slag discharge and improving a material utilization rate, and the slag is coated for the first time, so that functions of the slag are expanded, a beneficial technology of the slag is developed, manufacture methods of the coating are expanded, and a one-step molding and preparation technology of the matrix/coating is developed.

2. The present invention proposes to use the slag as a beneficial coating capable of exerting a surface modification effect for the first time, and designs a new self-shielded flux-cored welding wire on this basis, showing a potential of the slag—traditional harmful waste slag in surface modification, and design and preparation of a new material, so that an application field and a research scope of welding materials are expected to be greatly expanded.

3. The new self-shielded flux-cored welding wire designed by the present invention is free from deslagging, has a high bonding strength with the deposited metal, is able to generate the slag which has the special protective property and is difficult to be removed during welding, and has the seawater erosion corrosion resistance. In addition, the present invention further has additional benefits: not only the deslagging is not required, but also a labor intensity of a welder and a work efficiency are greatly improved, and not only waste of labor hours caused by the deslagging is avoided through welding with the welding wire, but also the material utilization rate is increased, the waste slag discharge is avoided, and an ecological environment is improved.

DETAILED DESCRIPTION

The present invention can be better understood according to the following embodiments. However, a specific ratio of ingredients of a flux core, process conditions and results thereof described in the embodiments are only used for illustrating the present invention, and should not and will not limit the present invention described in detail in the claims. A glass powder used in the following embodiments includes 57.2% $SiO_2$, 22.8% $B_2O_3$, 5.7% $Na_2O$, 9.2% CaO, 3.2% $ZrO_2$ and 1.9% $Al_2O_3$, a rutile powder includes no less than 98% $TiO_2$ and the balance of impurity elements Fe, Nb, Ta, Cr and Sn, and a corundum powder includes no less than 99% $Al_2O_3$ and the balance of impurity elements Cr, Ti, Fe and V.

Embodiment 1

A special protective slag coating formed in situ was prepared by evenly spreading a flux core powder on a Q235 steel plate through an arc fusion welding method in which a tungsten electrode was used as a non-consumable electrode. The Q235 steel included chemical ingredients of no more than 0.22% C, no more than 1.4% Mn, no more than 0.35% Si, no more than 0.050 S and no more than 0.045 P. The flux core powder was prepared according to the following masses: 80 g of glass powder, 2 g of zirconium oxide powder, 0.5 g of graphene powder, 2 g of sodium potassium carbonate powder, 2 g of potassium titanate powder, 3 g of rutile powder, 1 g of corundum powder, 1 g of sodium fluorosilicate powder, and 8.5 g of iron powder. When the coating was prepared by the arc fusion welding method, a height of the spread flux core powder was 2 mm, a welding current was 150 A to 250 A, a welding voltage was 18 V to 25 V, and a welding speed was 0.1 m/min. Please refer to Table 1 for results of seawater corrosion resistance test of surface-vitrified slag coating after fusion welding and results of combination test between slag coating and welded joint.

Embodiment 2

A special protective slag coating formed in situ was prepared by evenly spreading a flux core powder on a Q235 steel plate through an arc fusion welding method in which a tungsten electrode was used as a non-consumable electrode. The Q235 steel included chemical ingredients of no more than 0.22% C, no more than 1.4% Mn, no more than 0.35% Si, no more than 0.050 S and no more than 0.045 P. The flux core powder was prepared according to the following masses: 60 g of glass powder, 4 g of zirconium oxide powder, 0.05 g of graphene powder, 8 g of sodium potassium carbonate powder, 3 g of potassium titanate powder, 2 g of rutile powder, 3 g of corundum powder, 3 g of sodium fluorosilicate powder, and 16.95 g of iron powder. When the coating was prepared by the arc fusion welding method, a height of the spread flux core powder was 2 mm, a welding current was 150 A to 250 A, a welding voltage was 18 V to 25 V, and a welding speed was 0.1 m/min. Please refer to Table 1 for results of seawater corrosion resistance test of surface-vitrified slag coating after fusion welding and results of combination test between slag coating and welded joint.

Embodiment 3

A special protective slag coating formed in situ was prepared by evenly spreading a flux core powder on a Q235 steel plate through a laser fusion welding method. The Q235 steel included chemical ingredients of no more than 0.22% C, no more than 1.4% Mn, no more than 0.35% Si, no more than 0.050 S and no more than 0.045 P. The flux core powder was prepared according to the following masses: 70 g of glass powder, 8 g of zirconium oxide powder, 0.85 g of graphene powder, 6 g of sodium potassium carbonate powder, 1 g of potassium titanate powder, 5 g of rutile powder, 5 g of corundum powder, 2 g of sodium fluorosilicate powder, and 2.15 g of iron powder. When the coating was prepared by the laser fusion welding method, a height of the spread flux core powder was 2 mm, a power was 2000 W to 3500 W, a focal length was 300 mm to 400 mm, a spot diameter was 3 mm to 6 mm, and a scanning speed was 200 mm/min to 800 mm/min. Please refer to Table 1 for results of seawater corrosion resistance test of surface-vitrified slag coating after fusion welding and results of combination test between slag coating and welded joint.

Embodiment 4

A special protective slag coating formed in situ included a low-carbon steel belt and a flux core, and the flux core was filled in the low-carbon steel belt. The steel belt H08A included ingredients of 0.1% C, 0.3-0.55% Mn, 0.3% Si, no more than 0.03% S and no more than 0.03% P. The flux was prepared according to the following masses: 60 g of glass powder, 8 g of zirconium oxide powder, 0.05 g of graphene powder, 6 g of sodium potassium carbonate powder, 3 g of potassium titanate powder, 5 g of rutile powder, 1 g of corundum powder, 1 g of sodium fluorosilicate powder, and 15.95 g of iron powder. A weight of the flux core powder accounted for 13% of a total weight of the welding wire. All the powders were sifted through a 150-mesh sieve. All the powders were put into a powder mixer and mixed for 30 minutes, and then the mixed powders were added in a U-shape H08A carbon steel belt groove of 0.9 mm×14 mm. An opening of the U-shape groove was closed to cover the flux core power in the U-shape groove. The wire was drawn and a diameter thereof was reduced one by one through wire-drawing dies with diameters of 4.2 mm, 3.8 mm, 3.5 mm, 3.2 mm, 2.8 mm, 2.55 mm, 2.4 mm, 2.2 mm, 2 mm, 1.8 mm, 1.6 mm, 1.45 mm, 1.4 mm, 1.3 mm, 1.2 mm, 1.1 mm and 1.0 mm respectively to finally obtain a final product with a diameter of 1.0 mm. A welding current was 260 A to 300 A, a welding voltage was 24 V to 30 V, and a welding speed was 0.4 m/min. Please refer to Table 1 for results of seawater corrosion resistance test of surface-vitrified slag coating after fusion welding and results of combination test between slag coating and welded joint.

Embodiment 5

A self-shielded flux-cored welding wire with a special protective slag coating formed in situ included a low-carbon steel belt and a flux core, and the flux core was filled in the low-carbon steel belt. The steel belt H08A included ingredients of 0.1% C, 0.3-0.55% Mn, 0.3% Si, no more than 0.03% S and no more than 0.03% P. The flux core was prepared according to the following masses: 70 g of glass powder, 2 g of zirconium oxide powder, 0.25 g of graphene powder, 8 g of sodium potassium carbonate powder, 2 g of potassium titanate powder, 3 g of rutile powder, 5 g of corundum powder, 2 g of sodium fluorosilicate powder, and 7.75 g of iron powder. A weight of a flux core powder accounted for 25% of a total weight of the welding wire. All the powders were sifted through a 150-mesh sieve. All the powders were put into a powder mixer and mixed for 30 minutes, and then the mixed powders were added in a U-shape H08A carbon steel belt groove of 0.9 mm×14 mm. An opening of the U-shape groove was closed to cover the flux core power in the U-shape groove. The wire was drawn and a diameter thereof as reduced one by one through wire-drawing dies with diameters of 4.2 mm, 3.8 mm, 3.5 mm, 3.2 mm, 2.8 mm, 2.55 mm, 2.4 mm, 2.2 mm, 2 mm, 1.8 mm and 1.6 mm respectively to finally obtain a final product with a diameter of 1.6 mm. A welding current was 260 A to 300 A, a welding voltage as 24 V to 30 V, and a welding speed was 0.4 m/min. Please refer to Table 1 for results of seawater corrosion resistance test of surface-vitrified slag coating after fusion welding and results of combination test between slag coating and welded joint.

Embodiment 6

A self-shielded flux-cored welding wire with a special protective slag coating formed in situ included a low-carbon steel belt and a flux core, and the flux core was filled in the low-carbon steel belt. The steel belt H08A included ingredients of 0.1% C, 0.3-0.55% Mn, 0.3% Si, no more than 0.03% S and no more than 0.03% P. The flux core was prepared according to the following masses: 80 g of glass powder, 3 g of zirconium oxide powder, 0.85 g of graphene powder, 2 g of sodium potassium carbonate powder, 1 g of potassium titanate powder, 2 g of rutile powder, 3 g of corundum powder, 3 g of sodium fluorosilicate powder, and 5.15 g of iron powder. A weight of a flux core powder accounted for 18% of a total weight of the welding wire. All the powders were sifted through a 150-mesh sieve. All the powders were put into a powder mixer and mixed for 30 minutes, and then the mixed powders were added in a U-shape H08A carbon steel belt groove of 0.8 mm×12 mm. An opening of the U-shape groove was closed to cover the flux core power in the U-shape groove. The wire was drawn and a diameter thereof was reduced one by one through wire-drawing dies with diameters of 4.2 mm, 3.8 mm, 3.5 mm, 3.2 mm, 2.8 mm, 2.55 mm, 2.4 mm, 2.2 mm, 2 mm, 1.8 mm, 1.6 mm, 1.45 mm, 1.4 mm, 1.3 mm and 1.2 mm respectively to finally obtain a final product with a diameter of 1.2 mm. A welding current was 260 A to 300 A, a welding voltage was 24 V to 30 V, and a welding speed was 0.4 m/min. Please refer to Table 1 for results of seawater corrosion resistance test of surface-vitrified slag coating after fusion welding and results of combination test between slag coating and welded joint.

Comparison 1

A special protective slag coating formed in situ was prepared by evenly spreading a flux core powder on a Q235 steel plate through an arc fusion welding method in which a tungsten electrode was used as a non-consumable electrode. The Q235 steel included chemical ingredients of no more than 0.22% C, no more than 1.4% Mn, no more than 0.35% Si, no more than 0.050 S and no more than 0.045 P. The flux core powder included the following ingredients in percentage by mass: 55 g of glass powder, 8 g of zirconium oxide powder, 0.5 g of graphene powder, 8 g of sodium potassium carbonate powder, 3 g of potassium titanate powder, 4 g of rutile powder, 3 g of corundum powder, 3 g of sodium fluorosilicate powder, and 15.5 g of iron powder. When the coating was prepared by the arc fusion welding method, a height of the spread flux core powder was 2 mm, a welding current was 150 A to 250 A, a welding voltage was 18 V to 25 V, and a welding speed was 0.2 m/min. Please refer to Table 1 for results of seawater corrosion resistance test of surface-vitrified slag coating after fusion welding and results of combination test between slag coating and welded joint.

Comparison 2

A special protective slag coating formed in situ was prepared by evenly spreading a flux core powder on a Q235 steel plate through an arc fusion welding method in which a tungsten electrode was used as a non-consumable electrode. The Q235 steel included chemical ingredients of no more than 0.22% C, no more than 1.4% Mn, no more than 0.35% Si, no more than 0.050 S and no more than 0.045 P. The flux core powder included the following ingredients in percentage by mass: 85 g of glass powder, 3 g of zirconium oxide powder, 0.1 g of graphene powder, 2 g of sodium potassium carbonate powder, 1 g of potassium titanate powder, 2 g of rutile powder, 2 g of corundum powder, 2 g of sodium fluorosilicate powder, and 2.9 g of iron powder. When the coating was prepared by the arc fusion welding method, a height of the spread flux core powder was 2 mm, a welding current was 150 A to 250 A, a welding voltage was 18 V to 25 V, and a welding speed was 0.2 m/min. Please refer to Table 1 for results of seawater corrosion resistance test of surface-vitrified slag coating after fusion welding and results of combination test between slag coating and welded joint.

Comparison 3

A self-shielded flux-cored welding wire with a special protective slag coating formed in situ included a low-carbon steel belt and a flux core, and the flux core was filled in the low-carbon steel belt. The steel belt H08A included ingredients of 0.1% C, 0.3-0.55% Mn, 0.3% Si, no more than 0.03% S and no more than 0.03% P. The flux core was prepared according to the following masses: 50 g of glass powder, 5 g of zirconium oxide powder, 0.85 g of graphene powder, 3 g of sodium potassium carbonate powder, 2 g of potassium titanate powder, 5 g of rutile powder, 4 g of corundum powder, 2 g of sodium fluorosilicate powder, and 28.15 g of iron powder. A weight of the flux core powder accounted for 15% of a total weight of the welding wire. All the powders were sifted through a 150-mesh sieve. All the powders were put into a powder mixer and mixed for 30 minutes, and then the mixed powders were added in a U-shape H08A carbon steel belt groove of 0.9 mm×14 mm. An opening of the U-shape groove was closed to cover the flux core power in the U-shape groove. The wire was drawn and a diameter thereof was reduced one by one through wire-drawing dies with diameters of 4.2 mm, 3.8 mm, 3.5 mm, 3.2 mm, 2.8 mm, 2.55 mm, 2.4 mm, 2.2 mm, 2 mm, 1.8 mm, 1.6 mm, 1.45 mm, 1.4 mm, 1.3 mm and 1.2 mm respectively to finally obtain a final product with a diameter of 1.2 mm. A welding current was 260 A to 300 A, a welding voltage was 24 V to 30 V, and a welding speed was 0.4 m/min. Please refer to Table 1 for results of seawater corrosion resistance test of surface-vitrified slag coating after fusion welding and results of combination test between slag coating and welded joint.

Comparison 4

A self-shielded flux-cored welding wire with a special protective slag coating formed in situ included a low-carbon steel belt and a flux core, and the flux core was filled in the low-carbon steel belt. The steel belt H08A included ingredients of 0.1% C, 0.3-0.55% Mn, 0.3% Si, no more than 0.03% S, and no more than 0.03% P. The flux core was prepared according to the following masses: 88 g of glass powder, 2 g of zirconium oxide powder, 0.3 g of graphene powder, 3 g of sodium potassium carbonate powder, 1 g of potassium titanate powder, 2 g of rutile powder, 1 g of corundum powder, 1 g of sodium fluorosilicate powder, and 1.7 g of iron powder. A weight of a flux core powder accounted for 20% of a total weight of the welding wire. All the powders were sifted through a 150-mesh sieve. All the powders were put into a powder mixer and mixed for 30 minutes, and then the mixed powders were added in a U-shape H08A carbon steel belt groove of 0.8 mm×12 mm. An opening of the U-shape groove was closed to cover the flux core power in the U-shape groove. The wire was drawn and a diameter thereof was reduced one by one through wire-drawing dies with diameters of 4.2 mm, 3.8 mm, 3.5 mm, 3.2 mm, 2.8 mm, 2.55 mm, 2.4 mm, 2.2 mm, 2 mm, 1.8 mm, 1.6 mm, 1.45 mm, 1.4 mm, 1.3 mm, 1.2 mm, 1.1 mm and 1.0 mm respectively to obtain a final product with a diameter of 1.0 mm. A welding current was 260 A to 300 A, a welding voltage was 24 V to 30 V, and a welding speed was 0.4 m/min. Please refer to Table 1 for results of seawater corrosion resistance test of surface-vitrified slag coating after fusion welding and results of combination test between slag coating and welded joint.

Natural seawater was used as a test medium of the seawater corrosion resistance test, wherein a seawater conductivity was $4×10^{-2}$ S/cm and pH=8. A test temperature was adjusted by an open constant-temperature control tank, and a content of Cl⁻ was adjusted by adding distilled water and a NaCl solution into the seawater. A 3-electrode system was used in an electrochemical test, a saturated calomel electrode (SCE) was used as a reference electrode, a platinum niobium wire was used as an auxiliary electrode, a vitrified slag coating sample to be tested was used as a working electrode, and a surface area was 1 cm². An IM6 electrochemical workstation was used as a test system. A frequency range of AC impedance spectrum measurement was 100 kHz to 0.01 Hz, and an amplitude of an AC excitation signal was 10 mV. A corrosion current density was used for characterizing a seawater corrosion resistance. The smaller the corrosion current density was, the better the corrosion resistance was. The test results of the embodiments showed that the vitrified slag coating generated by welding had an excellent seawater corrosion resistance.

A method for measuring a coverage rate of the slag was carried out by performing plate welding on a test plate of 200 mm×80 mm×20 mm, molding the welded joint by one step with a length of about 150 mm, performing air cooling on the welded joint after welding, photographing a surface of a weld bead for computer image software analysis, and evaluating a coverage rate of the slag coating by a ratio of the coverage area of the slag coating to a total area of the surface of the welded joint.

An evaluation method of a deslagging property was used as a reference for the combination between the slag coating and the welded joint. With reference to the provisions on the deslagging property in the national welding rod evaluation proportion in 1989, a deslagging property test was performed on a self-made falling ball tester, a weight of a steel ball in the test was 3 kg, and a height from the steel ball to a welding test plate was 500 mm. The test plate was placed on the falling ball tester, and the weld bead was hit from a back of the test plate at a right position. A complete deslagging length, a slight slag bonding length and a severe slag bonding length were carefully measured and recorded after the falling ball test. The higher the slag bonding was, the higher the bonding strength between the slag coating and the welded joint was. A slag bonding rate was a ratio of a non-deslagging length to a total length of the weld bead. The higher the slag bonding rate was, the better the bonding between the slag coating and the welded joint was.

TABLE 1

Results of Seawater Corrosion Resistance Test of Surface-vitrified Slag Coating after Fusion Welding or Vitrified Slag Coating on Surface of Weld Bead and Results of Combination Test of Slag Coating and Welded Joint

|  | Corrosion current density (A · cm⁻²) | Coverage rate of slag coating (%) | Slag bonding rate (%) |
| --- | --- | --- | --- |
| Embodiment 1 | 0.006 | 98 | 100 |
| Embodiment 2 | 0.010 | 95 | 96 |
| Embodiment 3 | 0.001 | 100 | 95 |
| Embodiment 4 | 0.003 | 100 | 100 |
| Embodiment 5 | 0.002 | 98 | 100 |
| Embodiment 6 | 0.005 | 96 | 98 |
| Comparison 1 | 0.538 | 80 | 95 |
| Comparison 2 | 0.252 | 100 | 65 |
| Comparison 3 | 0.315 | 85 | 100 |
| Comparison 4 | 0.926 | 100 | 60 |

What is claimed is:

1. A flux core powder, wherein the flux core powder comprises the following ingredients in percentage by mass: 60-80% glass powder, 2-8% zirconium oxide powder, 0.05-0.85% graphene powder, 2-8% potassium sodium carbonate powder, 1-3% potassium titanate powder, 2-5% rutile powder, 1-5% corundum powder, 1-3% sodium fluorosilicate powder, and a balance of iron powder.

2. The flux core powder according to claim 1, wherein the glass powder comprises 57.2% SiO2, 22.8% $B_2O_3$, $_{5.7}$% $Na_2O$, 9.2% CaO, 3.2% $ZrO_2$ and 1.9% $Al_2O_3$.

3. The flux core powder according to claim 1, wherein the rutile powder comprises no less than 98% $TiO_2$, the impurity elements in the rutile powder are Fe, Nb, Ta, Cr and Sn, the corundum powder comprises no less than 99% $Al_2O_3$, and the impurity elements in the corundum powder are Cr, Ti, Fe and V.

4. The flux core powder according to claim 1, wherein the flux core powder is used to make a special protective slag coating formed in situ by a fusion welding method.

5. A self-shielded flux-cored welding wire, wherein the self-shielded flux-cored welding wire comprises a low-carbon steel and the flux core powder according to claim 1, the welding wire is made by filling a low-carbon steel belt with the flux core powder, and a weight of the flux core powder accounts for 13-25% of a total weight of the welding wire.

6. The self-shielded flux-cored welding wire according to claim 5, wherein the low-carbon steel belt is a low-carbon steel belt H08A, which specifically comprises 0.1% C, 0.3-0.55% Mn, 0.3% Si, no more than 0.03% S, and no more than 0.03% P.

7. The self-shielded flux-cored welding wire according to claim 5, wherein particle sizes of the glass powder, the zirconium oxide powder, the graphene powder, the potassium sodium carbonate powder, the potassium titanate powder, the rutile powder, the corundum powder, the sodium fluorosilicate powder and the iron powder in the flux core powder are all greater than or equal to 150 mesh.

8. The self-shielded flux-cored welding wire according to claim 5, wherein a thickness×a width of the low-carbon steel belt is any one of 0.9 mm×14 mm or 0.8 mm×12 mm.

9. The self-shielded flux-cored welding wire according to claim 5, wherein a diameter of the welding wire is any one of 1.0 mm, 1.2 mm or 1.6 mm.

10. A manufacture method of the self-shielded flux-cored welding wire according to claim 5, comprising the following steps of: (1) rolling the low-carbon steel belt in a U shape by a molding roller, and then adding the flux core powder into a U-shape groove through a powder delivery device according to 13-25% of the total weight of the welding wire; and (2) closing an opening of the U-shape groove to cover the flux core powder in the U-shape groove, drawing and reducing the diameter through a wire-drawing die one by one, and finally making the diameter thereof reach 1.0 mm, 1.2 mm or 1.6 mm to obtain a final product.

\* \* \* \* \*